United States Patent
Ulrich

[19]
[11] Patent Number: 5,957,461
[45] Date of Patent: *Sep. 28, 1999

[54] RADIAL LIP SHAFT SEAL

[75] Inventor: Donald Charles Ulrich, Collinsville, Ill.

[73] Assignee: John Crane Inc., Morton Grove, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,269

[22] Filed: Sep. 15, 1997

Related U.S. Application Data

[63] Continuation of application No. 08/606,421, Feb. 23, 1996.

[51] Int. Cl.⁶ .................................................. F16J 15/32
[52] U.S. Cl. .................... 277/569; 277/549; 277/568; 277/527; 277/585; 384/138; 384/147
[58] Field of Search ............................ 277/309, 351, 277/353, 506, 564, 565, 568, 569, 571, 572, 585, 549; 384/147, 148, 130, 138

[56] References Cited

U.S. PATENT DOCUMENTS

| | | | |
|---|---|---|---|
| 2,859,071 | 11/1958 | Riehl et al. | 384/147 |
| 3,449,021 | 6/1969 | Palen | 384/130 |
| 3,612,547 | 10/1971 | Kan | 277/568 |
| 3,642,290 | 2/1972 | Millsap | 277/562 |
| 4,053,166 | 10/1977 | Domkowski | 277/562 |
| 4,216,973 | 8/1980 | Kessinger, Jr. | 277/92 |
| 4,300,778 | 11/1981 | Gagne | 277/568 |
| 4,359,228 | 11/1982 | Cather | 277/565 |
| 4,869,514 | 9/1989 | Bogdanovic | 277/565 |
| 5,131,762 | 7/1992 | Wuskiewicz | 384/448 |
| 5,137,285 | 8/1992 | Pick | 277/562 |
| 5,181,581 | 1/1993 | Engler | 277/572 |
| 5,213,343 | 5/1993 | White, Jr. | 277/572 |
| 5,283,284 | 2/1994 | Brooks et al. | 525/179 |
| 5,421,592 | 6/1995 | Petrak | 277/572 |
| 5,503,408 | 4/1996 | Hemann et al. | 277/152 |

*Primary Examiner*—Daniel G. DePumpo
*Attorney, Agent, or Firm*—Dorn, McEachran, Jambor & Keating

[57] ABSTRACT

A unitary radial lip seal assembly to provide a fluid tight seal between a shaft and a housing bore through which the shaft extends includes an annular rigid retainer, a resilient body portion secured to the retainer and defining at least one sealing lip to seal against the rotatable shaft and a sleeve bearing member supported by said seal assembly outboard of the sealing lip. In one form the bearing member is rigidly connected to the retainer, in another, it is resiliently mounted to provide shaft vibration dampening. In the latter embodiment, the bearing member includes a radial wall urged into frictional engagement with a radial wall of the resilient body to restrict rotation of the bearing member.

20 Claims, 2 Drawing Sheets

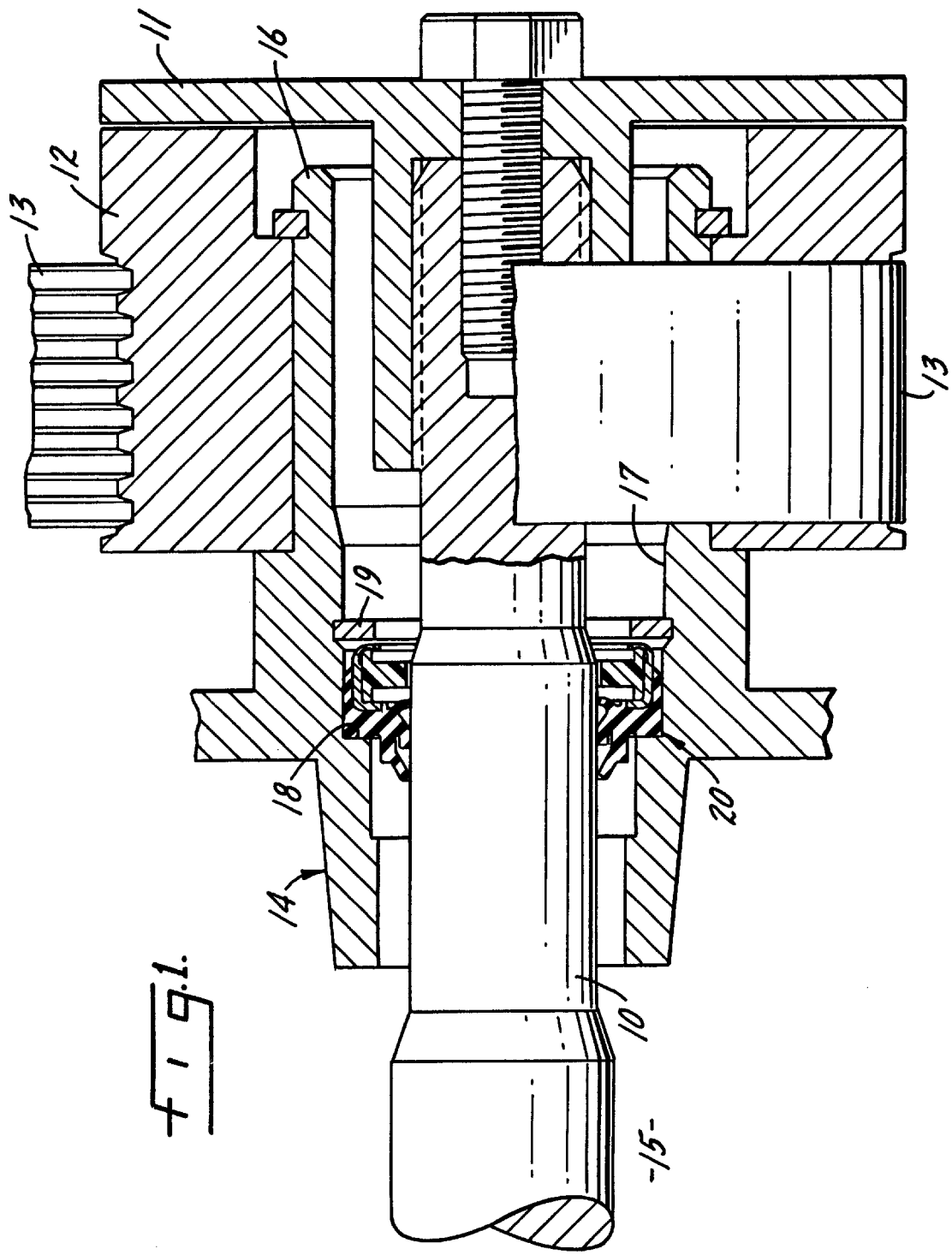

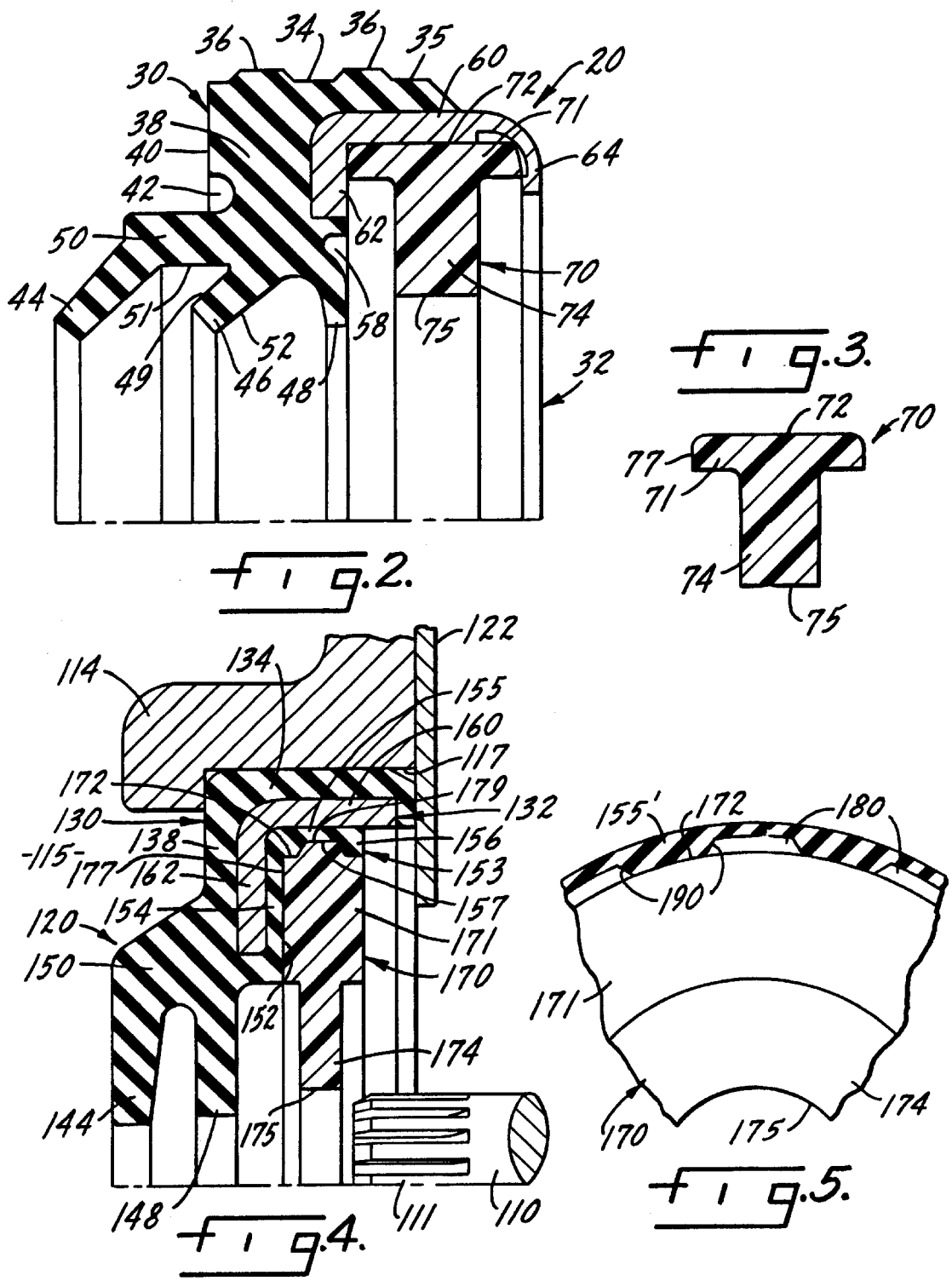

RADIAL LIP SHAFT SEAL

This application is a continuation of copending application Ser. No. 08/606,421 filed on Feb. 23, 1996.

BACKGROUND OF THE INVENTION

This invention relates to radial lip seals. More particularly, it relates to radial lip seals which can accommodate significant shaft-to-bore misalignment or dynamic shaft runout.

Lip seals are usually molded of a resilient elastomeric or polymeric material. They are secured in fluid tight relation to a housing and surround a rotating shaft which extends through an aperture in the housing wall. The sealing lip is in sealing relationship to the shaft to contain the fluid in the housing.

Lip seals components or elements include a rigid case or retainer to add rigidity and unitize the seal assembly. The case also aids installation, withdrawal and retention of the seal relative to the housing. The resilient body includes a secondary seal to seal against the housing and one or more resilient sealing lips which are maintained in sealing contact with the shaft.

Lip seals experience a wide variety of uses. Commonly such seals are employed in automotive applications operating temperatures and pressure, shaft speed, and the make-up of the medium to be contained, dictate the specifics of a particular construction. Typically, however, the rigid component or retainer is formed of hard plastic such as phenolic, steel or stainless steel and the resilient lips are defined by elastomeric or polymeric members such as molded rubber, polytetrafluroethylene or other known materials. The resilient element may be molded as a single body or may comprise a plurality of separate elements connected together in fluid tight relation.

The nature of lip seal applications expose the seal to conditions of significant shaft movement relative to the surrounding housing. Shaft misalignment and run-out challenge the effectiveness of the seal.

Examples of extreme service include automotive air conditioning compressors where the shaft is typically driven by a belt and pulley through an electric clutch. Compressor design results in shaft wobble, bending distortion and misalignment of the shaft axis relative to the housing aperture.

Efforts to provide a lip seal to accommodate shaft run-out or misalignment include use of extended conical shapes, multiple lips and other variations of the resilient element. A particularly effective arrangement is disclosed in copending U.S. Pat. No. 5,503,408 issued on Apr. 2, 1996, and assigned to John Crane Inc., Morton Grove, Ill. This seal embodies multiple resilient lips which may be integrally molded into the resilient component. The sealing lip effectiveness is augmented by an auxiliary or alignment lip which is interposed between the shaft and the sealing lip. Under conditions of misalignment, the auxiliary lip contacts the underside of the primary sealing lip and causes a displacement of that lip in the direction of displacement of the shaft relative to the center or axis of its associated housing bore. Such displacement causes the primary sealing lip to "follow" the shaft and, thereby, maintain the integrity of its sealing relation to the shaft.

Another effort to address the misalignment problem is reflected by U.S. Pat. No. 5,370,404, entitled "Radial Lip Seal With Interposed Bearing". That patent discloses incorporation of a roller bearing into the seal assembly to counteract misalignment or shaft displacement from a concentric relation to the associated bore. The approach shown presents other inherent difficulties deleterious to seal performance and longevity.

The disclosed bearing is interposed between the lip seal and the medium sealed within the housing. This relationship restricts access of the contained fluid medium to the sealing lips which seal against the shaft. The cooling effect provided by the sealed medium will be severely diminished and the seal will, therefore, experience excessive heat during operation which could result in heat aging of the lip element.

Also, the roller bearing arrangement disclosed in U.S. Pat. No. 5,370,404 involves very close tolerances between the bearing races, balls and associated shaft and housing connection. Such a bearing requires lubrication to ensure durability and therefore must be positioned internally of the housing for access to such lubrication.

U.S. Pat. No. 4,968,044 shows a lip seal excluder arrangement for an axle which incorporates a thrust bearing made of a hard plastic such as an internally lubricated nylon composition. The thrust bearing is loosely connected to a rigid retainer element of a lip seal assembly. It is free to rotate relative to the retainer. It is also disposed in the lubrication medium. Moreover, concentricity between a shaft and the associated housing is not addressed by the structure disclosed.

The seal of the present invention accommodates shaft runout or eccentric operation utilizing features not disclosed in the aforementioned U.S. Pat. Nos. 5,370,404 and 4,968,044.

Appliances such as dishwashers present a somewhat different problem which dictates against use of lip seal. Assembly tolerances permit shaft, to housing bore misalignment which exceeds the maximum allowable shaft run-out for a typical radial lip seal. Traditionally therefore other forms of seals were required.

The seal of the present invention addresses the problem and renders lip seals suitable for appliance applications.

SUMMARY OF THE INVENTION

The present invention is directed to a unitary lip seal assembly which includes a rigid retainer and a resilient member secured thereto with at least one generally radially directed lip for sealing engagement with a shaft. A relatively rigid sleeve bearing adapted to surround and provide support to an associated shaft is secured to the retainer outboard of the sealing lip. In one form, the bearing is rigidly secured to the retainer. In another, it is resiliently mounted to achieve vibration damping. In the latter form it includes an annular radial wall urged in frictional contact with annular radial surface formed on the resilient body to restrict the bearing against rotation.

BRIEF DESCRIPTION OF THE DRAWINGS

FIG. 1 is a partial view, in section, of a housing and rotatable shaft showing the seal assembly of the present invention.

FIG. 2 is a partial view, in section, and on an enlarged scale, showing the seal assembly of the present invention.

FIG. 3 is a partial, sectional view, of the bearing of the embodiment of FIG. 1.

FIG. 4 is a partial view, in section and on an enlarged scale, of a modified form of seal assembly and illustrating principles of the present invention.

FIG. 5 is a fragmentary plan view of a slightly modified form of bearing of the embodiment of FIG. 4.

DESCRIPTION OF THE PREFERRED EMBODIMENTS

Referring to FIGS. 1, 2 and 3, a lip seal assembly generally designated 20 is illustrative of the principles of the present invention. A rotatable shaft of a device such as an automotive air conditioning compressor is identified by reference numeral 10 in FIG. 1. Shaft 10 extends from a compressor housing 14 through a bore defined by cylindrical wall 16, which surrounds shaft 10 in spaced relation.

Shaft 10 is secured by a splined connection to driven member 11 of an electric clutch which includes driving pulley 12 supported on cylindrical wall 16 and driven by a power source such as the automotive engine crank shaft through drive belt 13. When the electric clutch is engaged, driven member 11 rotates with drive pulley 12 causing rotation of shaft 10.

Housing 14 defines internal chamber 15 which surrounds the shaft 10 and is partially filled with a lubricant. Compressor components (not shown) are disposed interiorly of the housing and operate to effect compression of the system refrigerant. A typical arrangement includes a wobble plate on the shaft which drives a series of pistons positioned about the shaft. Movement of these components causes agitation of the lubricant within the chamber 15 to provide lubrication to the internal components and cooling to seal assembly 20.

Cylindrical wall 16 of housing 14 includes cylindrical surface 17 which terminates in an annular radial wall defining shoulder 18. Seal assembly 20 is disposed in the annular space between cylindrical wall 16 and shaft 10 in sealing relation with the outer surface of shaft 10 and with surface 17 of wall 16. It separates chamber 15 from the environment external to the housing 14. It is retained in place by removable snap ring 19 which is disposed in an appropriately formed snap ring groove along surface 17 in cylindrical wall 16.

The details of seal 20 are best illustrated in FIGS. 2 and 3. Seal 20 includes an annular, resilient seal body 30 bonded to a rigid retainer 32. Retainer 32 is an annular, ring-like structure preferably made of a metallic material such as stainless steel. It includes a central, axial wall 60, a radial flange 62, and a retention flange 64. Flange 64 is swaged radially inwardly to complete the assembly as will be explained.

Resilient seal body 30 is an integral elastomeric or polymeric element formed by molding. Typically, the forming of the body and its bonding to retainer 32 occur simultaneously in a molding process. It includes an annular resilient ring portion 34 which is bonded to retainer axial wall 60. Ring portion 34 includes a pair of axially-spaced circumferential ribs 36 formed on an outer surface 35. Ribs 36 are of trapezoidal cross-section. When seal 20 is in its installed position, as illustrated in FIG. 1, ribs 36 sealingly engage cylindrical surface 17 of housing 14. In order to insure a fluid tight seal, the outer diameter of ribs 36 are formed to be larger than the inner diameter of sealing surface 17. Compressive deformation of the ribs 36 and ring portion 34 occurs on installation to form a fluid tight seal with surface 17.

Extending radially inwardly from ring portion 34 is radial body portion 38. Body portion 38 is located at the inboard axial end of seal 20, which is the end toward internal chamber 15 of housing 14. The opposite, or outboard axial end of seal 20 is exposed to the environment external to the housing.

Radial body portion 38 is bonded to radial flange 62 and defines radial face 40. In the installed position of seal 20, face 40 contacts radial shoulder 18 of housing 14 to provide a fluid tight seal. This seal could serve as the only static seal between housing 14 and seal body 30 in the absence of ring portion 34 and ribs 32.

An annular undercut or recess 42 is formed in face 40 near a radially innermost extent of body portion 38. Extending from body portion 38 radially inward of undercut 40 is annual primary lip 44. Axially outboard of primary lip 44 are annular alignment lip 46 and outboard lip 48. Each lip is in circumferential contact with shaft 10 when seal 20 is in its installed position. Thus, in the uninstalled condition of seal 20, each of the lip components should have an inside diameter considerably less than the outside diameter of shaft 10.

Conical primary lip 44 is joined to, and supported upon body portion 38 by annular base portion 50. Annular base portion 50 extends inboard of radial face 40 an axial distance approximately equal to the axial thickness of body portion 38. It is substantially coaxial with ring portion 34 and defines an inner cylindrical surface 51. Undercut 42 accommodates radial deflection, or flexure, of base portion 50, for purposes as will become apparent. Lip 44 extends on an incline radially inwardly, and in an axially inboard direction, from base portion 50.

Alignment lip 46 is positioned intermediate primary lip 44 and outboard lip 48. It is joined to, and supported by, body portion 38 at a radially inner terminus of body portion 38 below the juncture of base portion 50 with body portion 38. In an uninstalled position, lip 46 is inclined in a radially inward and an axially inboard direction, defining a conical shape that is substantially coaxial with conical primary lip 44. Lip 46 defines cylindrical outer surface 49, and a cylindrical inner surface 52.

An acute angle is defined between inner surface 51 of base portion 50 and outer surface 49 of lip 46. The thickness of lip 46 is such that on installation into a device such as housing about shaft 10 this angle is reduced to approximately zero degrees. Lip 46 is deformed from a conical shape into a cylindrical shape, with its outer surface 49 coaxial with, and contacting, inner cylindrical surface 51 of base portion 50, and its inner surface 52 coaxial with, and contact, shaft 10. Thus, the thickness of lip 46 is selected to match the nominal spacing between inner surface 51 of base 50 and shaft 10. Outboard lip 48 is also joined to, and supported by, body portion 38. It is inclined in an outboard axial direction opposite the inclination of lips 44 and 46 and toward the atmosphere external to housing chamber 15. Axial recess 58 is defined between lip 48 and body portion 38.

In an installed position, with all elements coaxial, seal 20 surrounds shaft 10 with radial face 40 of seal body 30 contacting radial shoulder 18 of housing 14. Ribs 36 of body 30 sealingly engage cylindrical surface 17 of wall 16 of housing 14. Lips 44, 46 and 48 are resiliently displaced radially outwardly and are urged into sealing contact with the outer surface of shaft 10. Primary lip 44 extends in an axially inboard direction and contacts shaft 10 to seal chamber 15, providing the primary containment for fluid in chamber 15.

Outboard lip 48 extends in an axially outboard direction and contacts shaft 10 circumferentially adjacent the external environment or atmosphere. Lip 48 excludes external contaminants from housing chamber 15. It also seals the system should a vacuum develop in housing chamber 15. Recess 58 provides rearward lip 48 with the requisite range of flexure.

Alignment lip 46 is an alignment member for primary lip 44, that is, it urges lip 44 into coaxial relation to shaft 10. In a device such as an automotive air conditioning compressor, during operation, a shaft having a one-half inch diameter may be subject to as much as 0.025 inches of shaft-to-bore misalignment in any radial direction. The lip arrangement describe above maintains a fluid tight seal against shaft 10 even under such operations conditions.

In accordance with the present invention, seal assembly 20 includes a sleeve bearing member 70 secured to retainer 32 outboard of resilient molded body 30. That is, in the installed position, the bearing member 70 of seal assembly 20 is separated from chamber 15 of housing 14 by the sealing lip members of body 30.

As best seen in FIGS. 2 and 3, sleeve bearing member 70 defines annular body of "T" shaped cross section having a radial outer portion 71 with cylindrical surface 72 sized to coincide with the inner axial surface of central axial wall 60 of retainer 32. The axial length of radial outer portion 71 of the body is such that wedging of retention flange 64 to its curved shape illustrated in FIG. 2 secures sleeve bearing member 70 into the seal assembly 20. Inboard radial edge 77 of outer portion 71 abuts radial flange 62. The opposite radial edge of portion 71 is in securing contact with swedged retention flange 64. Outer surface 72 is in contact with the inner surface of axial wall 60 of retainer 32. This relationship non-rotatably secures the bearing member 70 in the assembly. When installed with ribs 36 and radial body portion 34 deformed into a fluid tight relationship with cylindrical surface 17 of cylindrical wall 16, the bearing member 70 is retained against radial displacement to provide shaft support as is explained below. The configuration of flange 64 also permits easy removal of the entire assembly 20 for replacement.

Sleeve bearing member 70 includes radially inner portion 74 of a lesser axial length than outer portion 71. The axially narrow shape of portion 74 provides axial spacing relative to outboard lip 48 to permit the lip to function against shaft 10.

Radial inner portion 74 of bearing member 70 defines cylindrical bearing surface 75 sized to be in close supporting contact with the outer surface of shaft 10. Surface 75 is nominally coaxial with the other seal components including sealing lip members 44, 46 and 48.

Installed in a housing, as illustrated in FIG. 1, the sealing elements of the seal assembly 20 are disposed inboard of the bearing member 70. Thus, the bearing is outboard of the sealed chamber 15 and in the environment external to the housing 14. The bearing member, in this arrangement cannot interfere with action of the fluid medium within the chamber 15 on the sealing lip portions of the seal 20. This relationship also places the sleeve bearing member 70 toward the power input or drive end of the shaft, thereby providing optimal bearing support for the shaft.

A wide variety of materials are suitable for use in the sleeve bearing member. These include cast iron, powder metal composites, bronze, filled polytetrafluroethylene (PTFE) and thermoplastic polymers such as nylon and filled polyphthalamide (PPA). It is important that the material selected be sufficiently rigid to resist compression under the eccentric deflection action of the shaft which results from lack of concentricity with bore surface 17. It should also be a material that is sufficiently self lubricating to permit extended running in a dry condition. Also, when ambient operating conditions dictate, such as in the engine compartment of a vehicle where operating temperatures may exceed 300 degrees F., materials such as filled PTFE or filled PPA should be used. Filled PPA is considered particularly suitable because of its integrity at high temperature conditions.

The clearance between cylindrical bearing surface 75 and the outer diameter of the shaft 10 must be such as to restrict deflection or displacement of the shaft 10 relative to surface 17 of wall 16 within the capabilities of the lip sealing elements of seal assembly 20. If the lip seal elements are capable of maintaining a sealed relation with 0.025 inch diametral displacement of the shaft from a coaxial relation with the surface 17, the clearance between the surface 75 and the shaft 10 must be less than 0.025 inches on the diameter.

For example, in automotive air conditioner compressor service, total shaft wobble could exceed 0.040 inches, that is, 0.020 inches in any direction from coaxial. A seal with the resilient body 30 configured such as illustrated in FIGS. 1 and 2 can accommodate shaft wobble of up to 0.025 inches, diametral deviation, that is, 0.0125 inches deviation from coaxially operation. Bearing 70, is formed of a thermoplastic such as nylon with a cylindrical bearing surface 75 about 0.020 inches larger than the diameter of shaft 10. The bearings will thus restrict eccentric deviation of the shaft axis relative to the surface 17 of housing wall 16 within the acceptable range of the seal assembly 20. Seal element 30 will maintain a sealing relation with the shaft 10. If even more restriction of shaft wobble is necessary for a particular application, the bearing element 70 may be made of a more rigid material such as bronze, or a powder metal composite. The diametral clearance between sleeve bearing surface 75 and the outer diameter of Shaft 10 in such instance could be reduced to 0.005 inches.

Another application for a seal assembly embodying the principles of the present invention is appliance service such as dishwashers. Radial lip seals have not been successfully employed because of the alignment tolerance permitted between the pump and its drive motor shaft and the housing bore through which the shaft extends into the internal of the appliance. Efficient assembly and field repair procedures permit substantial misalignment of the pump motor shaft and housing bore. The seal of the present invention eliminates this misalignment thereby permitting use of a lip seal to seal the chamber against leakage.

Turning now to FIGS. 4 and 5, there is illustrated a seal assembly, designated 120, embodying the principles of the present invention and considered particularly suitable for appliance service. As in the prior embodiment, the seal assembly disposed in a housing bore in sealing relation to a shaft extending through the bore. The seal assembly 120 is intended to isolate the internal chamber of the housing which may contain liquid such as water from the external environment to contain the fluid content of the housing while permitting rotation of the shaft.

Typically, assembly procedures require alignment of the electric motor shaft to the housing which contains the seal. The permitted tolerance is such however, that the possible misalignment of the motor shaft to housing bore exceeds the capability of the seal to maintain a sealing relation to the installed shaft. As a result, in the past, seals other than lip seals were typically employed.

Turning now to the embodiments of the FIGS. 4 and 5 a seal assembly 120 is mounted in a sealing relation to a cylindrical surface 117 defined by a bearing housing 114. The housing 114 is in this instance mounted on the inboard or chamber side 115 of a wall 122 of an appliance. The appliance assembly procedure involves insertion of a shaft 110 of a drive motor through an aperture in wall 122 and through the seal assembly 120 from the ambient or outboard side of the appliance. A splined motor shaft end 111 engages a pump or other device disposed in the chamber 115. The motor is then secured to the external or ambient side of the appliance wall 122.

Seal 120 includes an annular resilient seal body 130 bonded to a rigid retainer 132. Retainer 132 is an annular, ring-like structure preferably made of a metallic material such as stainless steel. It includes a central axial wall 160, and a radial flange 162.

Seal body 130 is an integral elastomeric or polymeric element formed by molding. It includes an annular resilient ring portion 134 which is bonded to retainer axial wall 160. When seal 120 is in its installed position, resilient ring portion 134 sealingly engages cylindrical surface 117 of housing 114. In order to insure a fluid tight seal, the outer diameter of member 134 is formed to be larger than the inner diameter of its cooperating sealing surface on the housing. Compression of the ring portion 134 occurs on installation to establish a sealing relation.

Extending radially inwardly from ring portion 134 is radial body portion 138. Body portion 138 is located at the inboard axial end of seal 120, which is the end toward the interior of the associated housing. When installed, the opposite, or outboard axial end of seal 120 is exposed to the environment external to the housing. Body portion 138 is bonded to radial flange 162.

Extending from body portion 138 radially inwardly is an annular portion 150 which extends radially inward and also axially outboard of portion 138. Radially directed primary lip 144 extends from body portion 150. Axially outboard of primary lip 144 is a second or outboard radial lip 148 formed upon base portion 150. Each lip is annular and arranged for circumferential contact with an associated shaft when seal 120 is in its installed position. In the uninstalled condition of seal 120 each of the lip components should have an inside diameter considerably less than the outside diameter of the shaft. On installation, lips 144 and 148 are deformed axially inboard and take a conical shape in the inboard direction. The thickness and internal diameter of lips 144 and 148 are selected to maintain such sealing contact with the shaft through its expected range of eccentric operation.

In the embodiments of FIGS. 4 and 5, resilient member 130 defines a resilient annular bearing support 153 outboard of annular base portion 150. Bearing support portion 153 defines radial ring portion 154 molded to radial flange 162 of rigid retainer 132 which defines radial annular surface 152. Support portion 153 includes axial ring portion 155 molded internally of axial wall 160 of rigid retainer 132. The inner, axial cylindrical surface of axial ring portion 155 includes a groove 157 to define circumferential lip 156 disposed outboard of radial surface 152.

In accordance with the present invention, seal assembly 120 includes a "T" shaped sleeve bearing member 170 secured to retainer 132 outboard of resilient molded body 130. In the installed position the bearing member 170 of seal assembly 120 is outboard of the interior of the associated housing separated by the sealing lip members 144 and 148.

Sleeve bearing member 170 defines radial outer portion 171 having a radial surface 177 coextensive with radial surface 152 of radial ring portion 154. Member 170 has a radial outer cylindrical surface 172 sized to coincide with the inner axial surface of bearing support axial ring portion 155. The axial length of radial outer portion 171 of the bearing is such that it coincides with the axial length of the inner circumferential surface of axial support ring portion 155.

Bearing member 170 includes a radially outwardly directed ridge 179 along outer surface 172 which mates with groove 157 in bearing support ring portion 155. With the bearing 170 installed in bearing support portion 153, outer circumferential surface 172 is in contact with the inner surface of axial ring portion 155 with ridge 179 in groove 157. Circumferential lip 156 imparts an axial force against ridge 179 to urge radial surface 177 frictional engagement against annular radial surface 152. This relationship secures the bearing member 170 in the assembly and retains it against rotation.

Sleeve bearing member 170 includes radially inner portion 174 of a lesser axial length than outer portion 171. In this embodiment the axially narrow shape of portion 174 is merely illustrative since in the installed condition both lips 144 and 148 extend in the inboard direction.

Radially inner portion 174 of bearing member 170 defines cylindrical sealing surface 175 sized to be in close supporting contact with the outer surface of shaft 110. Installed in a housing, as illustrated in FIG. 4, the sealing elements of the seal assembly 120 are disposed inboard of the bearing member 170. Thus, the bearing is outboard of the sealed chamber and in the environment external to the housing.

To secure bearing member 170 against rotation relative to the other seal elements it has been found that the area of radial annular surface 177 which is urged into frictional contact with radial surface 152 must exceed the area of the cylindrical bearing surface 175 by about 3 to 1.

In instances where the size of the components preclude obtaining the 3 to 1 ratio, an alternative arrangement is contemplated for restraining bearing 170 against rotation. Referring to FIG. 5 the bearing member 170 is modified slightly, with a complementary change to the bearing support portion 153 of resilient member 130. As illustrated, circumferential ridge 179 is replaced by protrusions 180. The resilient member ring portion 155, is modified such that the groove 157 of axial surface of axial ring portion 155 is replaced with a plurality of pockets 190. On attachment of bearing elements 170 to resilient bearings support portion 153 protrusions 179 engage pockets 190 to secure the bearing member against rotation.

A wide variety of materials are suitable for use in the sleeve bearing member. These include cast iron, powder metal composites, bronze, filled PTFE, filled PTA and thermoplastic polymers such as nylon. It is important that the material selected be sufficiently rigid to accomplish alignment of the shaft relative to the housing bore. In this embodiment, the bearing surface 175 is sized relative to its associated shaft such that during assembly of the appliance the motor shaft is aligned sufficiently to permit operation within the acceptable tolerance of the seal lip members 144 and 148.

In the appliance application, the primary function of the bearing 170 of assembly 120 is to align the shaft such as shaft 110 of an electric motor to the seal housing 114 at the time the motor is installed. The housing 114 has the seal 120 already installed coaxially within a bore such as cylindrical surface 117 with the bearing element 170 outboard of the chamber 115 to be sealed. The motor shaft is installed into the assembly through mate with a pump or other device already mounted interiorly of the housing. As the shaft is passed through the bearing defining aperture it is guided by the bearing surface 175 to a position sufficiently coaxial with the housing to permit the lip seal lips 144 and 148 to provide a fluid tight seal upon the outer surface of shaft 110.

As the shaft end is moved into the housing from the outboard side of seal assembly 120 it deforms the lips 144 and 148 axially in the inboard direction, away from bearing member 170. The conical shape thus assumed by lips 144 and 148 provides sealing engagement with the shaft.

To provide the alignment capability the cylindrical bearing surface 175 should have a clearance relative to the shaft that insures mounting of the motor and shaft within the capabilities of the lip seal elements 144 and 148. Typically the shaft is about one-half inch in diameter. The diametral clearance of cylindrical bearings surface 175 should be about 0.012 inches to thereby hold maximum shaft offset relative to surface 116 to 0.006 inches.

The above dimensional illustration contemplates usage of a sleeve bearing member 170 made of thermoplastic material such as nylon. A size-on-size bearing to provide true coaxial alignment, that is, one with a cylindrical surface 175 made the same diameter as the motor shaft would be acceptable if the bearings member 170 were made, for example, from a soft bearing material such a virgin polytetrafluroethylene. Such material would avoid excessive heat generation at the bearing-shaft interface during motor operation.

Noise attenuation is also an important aspect to be considered. The mounting of bearing member 110 in the embodiment of FIGS. 4 and 5 provides for resilient mounting. The axial and radial ring portions 154 and 156 provide a resilient support for bearing member 170. This arrangement results in dampening of vibrations which would otherwise be transferred from the shaft to the housing through the seal assembly 120 and particularly bearing member 170.

It should be understood that the particular configuration of the various elements of the seal assemblies 20 and 120 are for illustrative purposes. The particular application of the invention will dictate the specific construction. For example, it is not necessary to the invention that the resilient body elements 30 or 130 have the specific combinations of lip configurations shown. One or more lips may be employed, depending on the type of service. Moreover, it is not necessary that the lips be molded integrally with the resilient body. Separate lip members of the same, or different material could be employed which are secured into the seal assembly 20 or 120.

Also, it is contemplated that bearing members 70 or 170 not comprise a complete annular ring. The bearing surfaces 75 or 175 could be defined upon separate "pie shaped" segments which define a segmented member 70 or 170 secured into the seal 20 or 120 in the assembly process. Of course, the cross section of the bearing member need not be "T" shaped. It could be square, rectangular, trapezoidal or any other suitable configuration dependant on the requirements of a particular application.

Various features of the present invention have been explained with reference to the embodiments shown and described. It must be understood, however, that modifications may be made without departing from the spirit and scope of the invention.

I claim:

1. A unitary radial lip seal assembly for disposition in sealing relation between a surface defining a bore in a housing wall and a rotatable shaft having a predetermined diameter extending through the housing bore to contain fluid within the interior of the housing comprising:

a) a rigid annular retainer member including an axial wall and an annular radial flange joined to said axial wall;

b) a resilient annular body portion secured to said retainer member, said resilient annular body portion defining at least one radial sealing lip extending away from said annular retainer member, said sealing lip being shaped, dimensioned and adapted for providing sealing engagement with the shaft; and c) a compression-resistant sleeve bearing member secured to said retainer member, said sleeve bearing member defining an inner cylindrical bearing surface shaped, dimensioned and adapted for being disposed in surrounding relation to the shaft and an outer cylindrical bearing surface shaped and dimensioned for disposition adjacent said retainer member axial wall, said sleeve bearing member being adapted for disposition between said axial wall and the shaft, said sleeve bearing member being positioned relative to said sealing lip such that said sealing lip is adapted to provide contact with the shaft intermediate said cylindrical bearing surface and the fluid in the interior of the housing.

2. A unitary radial lip seal assembly as claimed in claim 1, wherein said sleeve bearing member includes a radial outer portion defining spaced radial edges, and said retainer includes a radial flange and a retention flange with said edges of said radial outer portion of said bearing swedged therebetween.

3. A unitary radial lip seal assembly as claimed in claim 2 wherein said bearing radial outer portion further defines a cylindrical outer surface and said retainer includes an axial wall defining a cylindrical surface disposed in mating relation to said cylindrical outer surface of said sleeve bearing member.

4. A unitary radial lip seal assembly as claimed in claim 3 wherein, upon installation, said resilient annular body portion further provides for a static seal between said assembly and the housing.

5. A unitary radial lip seal assembly as claimed in claim 1 wherein said inner cylindrical bearing surface is sized relative to the predetermined diameter of the shaft such that, upon installation, the clearance therebetween is less than the expected amount of eccentric operation of the shaft relative to the bore in the housing, so that said lip seal maintains annular contact with and a fluid tight relation to the shaft.

6. A unitary radial lip seal assembly as claimed in claim 5 wherein the clearance between the cylindrical bearing surface and the shaft is less than 0.020 inches.

7. A unitary radial lip seal assembly as claimed in claim 1 wherein said sleeve bearing member is made of filled polyphthalamide (PPA).

8. A unitary radial lip seal assembly as claimed in claim 1 wherein said resilient annular body portion includes a bearing support portion;

said bearing support portion includes a radial surface; and wherein said sleeve bearing member includes a radially outer portion defining a radial surface in frictional contact with said radial surface of said bearing support portion to preclude rotation of said bearing member.

9. A unitary radial lip seal assembly as claimed in claim 4, wherein the housing includes a section having a cylindrical wall surface provided for disposing said seal assembly therein, and said retainer member has an outer diameter less than the diameter of the housing inner cylindrical surface, so as to provide an annular clearance, wherein, upon installation, a section of said annular body portion is disposed in said clearance between said retainer member and the housing inner cylindrical surface to provide a static seal therebetween.

10. A unitary radial lip seal assembly according to claim 1 wherein said sleeve bearing member is sufficiently rigid so as to resist compression under the eccentric deflection action of the shaft.

11. A unitary radial lip seal assembly as claimed in claim 1 wherein said sleeve bearing member comprises at least one material taken from the group consisting of cast iron, powder metal composites, bronze filled polytetraethylene and thermoplastic polymers.

12. A unitary radial lip seal assembly as claimed in claim 1, wherein said rigid annular retainer member further comprises a metallic material.

13. A unitary radial lip seal assembly as claimed in claim 12 wherein said rigid annular retainer member comprises stainless steel.

14. A method of aligning a shaft relative to a bore in a housing wall which shaft is rotatably supported within a member to be secured to the housing wall comprising the steps of:

1) providing a unitary radial lip seal assembly which seal assembly includes:
   a) a rigid annular retainer member including an axial wall;
   b) a resilient annular body portion secured to said retainer member, said resilient annular body portion defining at least one radial sealing lip adapted for providing sealing engagement with the shaft;
   c) a compression-resistant sleeve bearing member secured to said retainer defining an inner cylindrical bearing surface, said sleeve bearing member being shaped, dimensioned and adapted for disposition in surrounding relation to the shaft, said sleeve bearing member further defining an outer cylindrical bearing surface adapted to provide radial support between said axial wall of said rigid annular retainer member and the shaft;
 2) disposing said seal assembly in the bore in the housing wall;
 3) inserting an end of the shaft through said bearing member and then through said at least one sealing lip after said seal assembly is disposed in the housing wall bore; and
 4) retaining said member that rotatably supports the shaft adjacent the housing wall.

15. The method according to claim 14 wherein said retaining step further includes providing a snap ring for insertion into a groove in a cylindrical wall of the housing to restrict the axial movement of said seal assembly relative to the housing.

16. A unitary radial lip seal assembly for disposition in sealing relation between a surface defining a bore in a housing wall and a rotatable shaft extending through the housing bore to contain fluid within the interior of the housing comprising:

a) a rigid annular retainer member, including an annular axial wall and an annular radial flange, defining a radial surface, said radial flange being joined to said annular axial wall;
 a resilient annular body portion secured to said retainer member, said resilient annular body portion defining at least one radial sealing lip adapted for sealing engagement with the shaft and a bearing support portion having a radial surface, said bearing support portion defining a bearing support portion groove and including a lip portion spaced from said bearing support portion radial surface; and
 c) a compression-resistant sleeve bearing member secured to said retainer member, said sleeve bearing member defining an inner cylindrical bearing surface adapted for disposition in surrounding relation to the shaft and being dimensioned and positioned relative to said sealing lip such that said lip is adapted to contact the shaft intermediate said inner cylindrical bearing surface and the fluid in the interior of the housing, said sleeve bearing member further defining an outer cylindrical bearing surface in frictional contact with said radial surface of said radially outer portion of said rigid annular retainer member to inhibit rotation of said bearing member, said bearing member further including a ridge for engagement with said bearing support portion groove, and said lip portion providing a bias to urge said radial surface of said sleeve bearing member radially outer portion into frictional engagement with said bearing support portion radial surface.

17. A unitary radial lip seal assembly as claimed in claim 16 wherein
 the annular area of said radial surface of said bearing member exceeds the surface area of said cylindrical bearing surface by the ratio of about 3 to 1.

18. A unitary lip seal assembly as claimed in claim 17 wherein the cylindrical bearing surface is sized relative to the shaft such that the clearance therebetween is less than the amount of eccentric operation of the shaft relative to the bore in the housing permissible for said lip seal to maintain a fluid tight relation to the shaft.

19. A unitary radial lip seal assembly as claimed in claim 18 wherein the clearance between the cylindrical bearing surface and the shaft is less than 0.020 inches.

20. A unitary radial lip seal assembly as claimed in claim 19 wherein said sleeve bearing is made of filled polyphthalamide (PPA).

* * * * *